United States Patent

Skala

[15] 3,647,300
[45] Mar. 7, 1972

[54] DUAL-BEAM FLUID MONITOR FOR MEASURING TRANSMITTED AND SCATTERED LIGHT

[72] Inventor: George Frank Skala, Scotia, N.Y.
[73] Assignee: Environment/One Corporation, Latham, N.Y.
[22] Filed: Apr. 27, 1970
[21] Appl. No.: 31,995

[52] U.S. Cl. ........................356/73, 250/218, 250/220 SD, 250/233, 356/104, 356/205
[51] Int. Cl. ......................................................G01n 21/22
[58] Field of Search ..............250/232, 233, 220, 218; 350/6, 350/7; 356/88, 89, 93–97, 103, 104, 205, 73

[56] References Cited

UNITED STATES PATENTS

| | | | |
|---|---|---|---|
| 3,071,037 | 1/1963 | Brumley | 356/94 |
| 3,506,358 | 4/1970 | Baba et al. | 356/88 |
| 3,455,637 | 7/1969 | Howard | 356/205 |
| 3,256,444 | 6/1966 | Jones et al. | 250/232 X |
| 2,832,264 | 4/1958 | Buck | 350/7 |
| 3,409,373 | 11/1968 | Matthews | 356/95 X |
| 3,418,053 | 12/1968 | Pelavin | 250/218 |

FOREIGN PATENTS OR APPLICATIONS

| | | | |
|---|---|---|---|
| 718,434 | 3/1942 | Germany | 356/205 |

OTHER PUBLICATIONS

Wright: "Comparison-Type Nephelometer," The Review of Scientific Instruments, vol. 28, No. 2, Feb. 1957 pages 129–134

*Primary Examiner*—Ronald L. Wibert
*Assistant Examiner*—F. L. Evans
*Attorney*—Charles W. Helzer and Thomas E. Beall, Jr.

[57] ABSTRACT

An optical system for determining the contamination, chemical breakdown, or other change in a fluid that manifests itself in a change in optical properties of the fluid with respect to attenuation or a scattering of a light beam, wherein the light from a single source is optically split to pass in parallel through a reference material and a sample material for recombining as an input to a transducer that produces a correlated electrical output signal. Switching means is provided in each of the parallel paths of the light to alternately feed a light pulse from the sample material and the light pulse from the reference material to the transducer. Additional electric switching means is provided to separate the correlated electrical signals produced by the transducer respectively for the sample and reference materials. The optical switching means may be a motor rotated or oscillated mirror, a vibrated mirror, a motor or fluid operated screen disc, or the like. A switching electrical signal is produced by magnetic coding or optically from movement of the mirror or a screen, which will actuate the electrical switching means.

5 Claims, 8 Drawing Figures

INVENTOR
GEORGE F. SKALA

BY Charles W. Helzer
ATTORNEY

PATENTED MAR 7 1972 3,647,300

INVENTOR
GEORGE F. SKALA

BY *Charles W. Helzer*
ATTORNEY

DUAL-BEAM FLUID MONITOR FOR MEASURING TRANSMITTED AND SCATTERED LIGHT

BACKGROUND OF THE INVENTION

The present invention is an improvement upon the "Optical Fluid Contamination and Change Monitor," the subject matter of applicant's copending application Ser. No. 847,675, filed Aug. 5, 1969.

SUMMARY OF THE INVENTION

The optical system of the present invention will produce electrical signals correlated to the contamination, chemical breakdown, or other change in a fluid, for example, oil or cooling water, for purposes of monitoring, testing, or the like. A sealed annular chamber is provided with a light source, a control signal producing light-responsive transducer, and two light-responsive transducers for respectively producing signals correlated to the scattering and attenuation of a light beam passing through the material to be tested and passing through a reference material. Mechanical means are used to split the light alternately between the sample and the reference material so that the attenuation and scattering signals will correspondingly alternate between reference and sample. An electrical circuit is used that is responsive to the control signal for separating the reference signal from the sample signal for both the attenuation and scattering.

Optical fibers are preferably employed for transmitting the light between various locations and the light beam may be split by a rotating mirror, vibrating mirror, moving screen or the like.

BRIEF DESCRIPTION OF THE DRAWING

Further objects, features, and advantages of the present invention will become more clear from the following detailed description of the drawing, wherein.

DETAILED DESCRIPTION OF THE DRAWING

Figure 1:
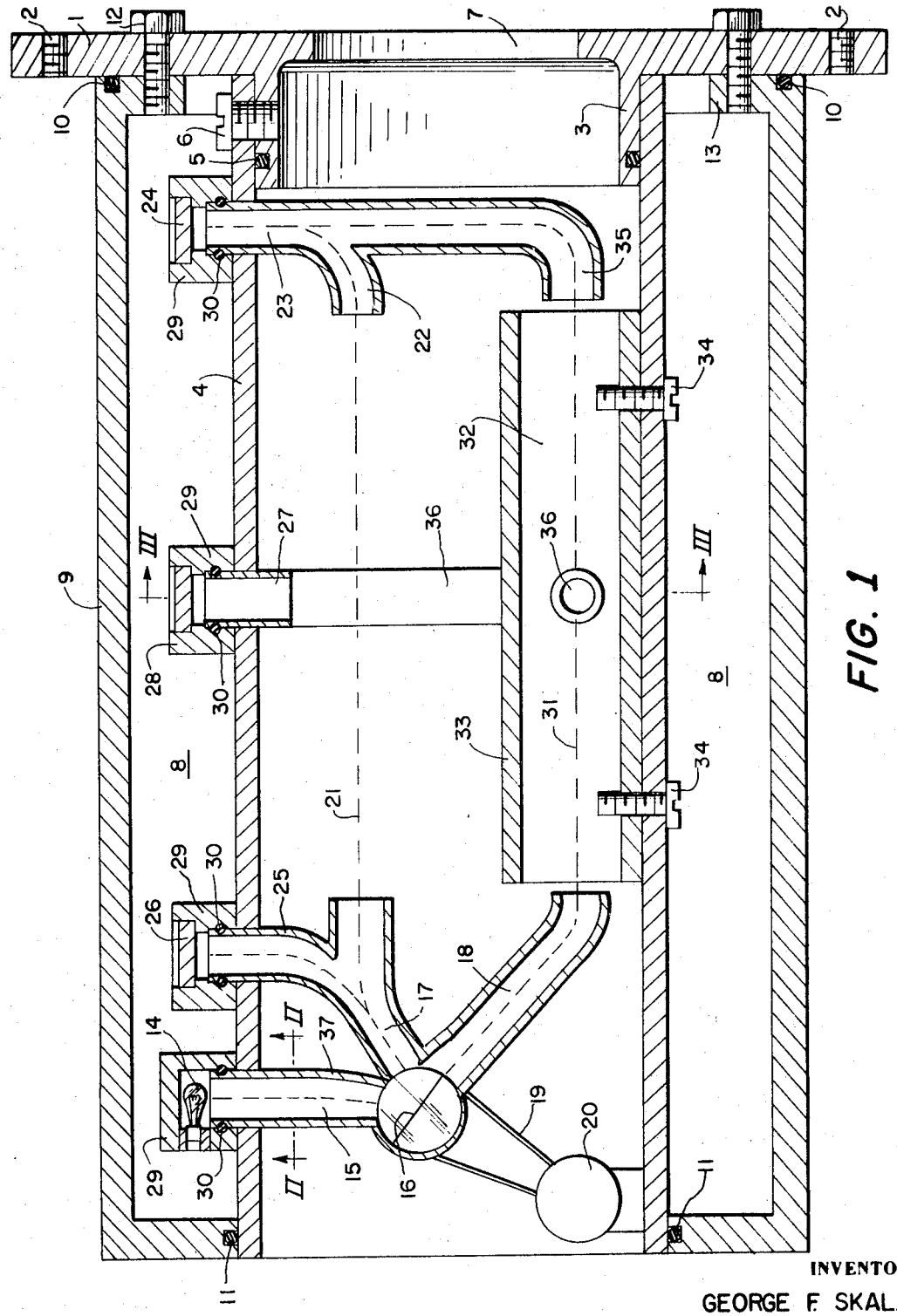
FIG. 1 is a cross-sectional view taken through the central axis of an optical system employing the features of the present invention.

As shown in FIG. 1, a mounting plate 1 for the optical system of the present invention is provided with a plurality of threaded holes 2 for securing the system in a particular test location, for example, within an engine oil pan housing, or the cooling water storage system of a heat-producing mechanism. A cylindrical mounting portion 3 of the plate 1 telescopically receives one end of a cylindrical tube 4, with the interposition of a conventional sealing O-ring 5. The mounting portion 3 and tube 4 are securely held in this position by means of a suitable machine screw 6. In the test environment, fluid will be contained within the interior of tube 4 and may even be pumped through the opening 7 in the plate 1 to the other end of the tube.

An outer sealed annular chamber 8 is formed around the tube 4 by a surrounding generally annular housing 9, which is sealed at one end by means of an O-ring 10 where it abuts against the mounting plate 1 and sealed at its other end by means of an O-ring 11 where it slidingly and telescopically engages the tube 4. The housing 9 is securely held on the mounting plate 1 by means of a plurality of peripherally arranged machine screws 12, which extend through the plate 1 and are threadingly received within an inturned flange 13 of the housing 9.

A single light source 14 is mounted within the chamber 8 to direct a beam of light through an optical fiber 15 for striking a mirror 16, where it is selectively reflected into either the branch optical fiber 17 or the branch optical fiber 18, depending upon the position of the mirror relative to the fibers. The mirror 16 is suitably journaled for rotation about an axis perpendicular to the plane of FIG. 1, and is driven through belt 19 by a small electric motor 20 that is mounted on the internal surface of the tube 4. It is thus seen that with each revolution of the mirror 16, the light beam from the light source 14 and optical fiber 15 will be reflected once into the branch optical fiber 17 and once into the branch optical fiber 18.

The light beam passing through the branch optical fiber 17 will travel along light path 21 through the fluid material contained within the tube 4 for attenuation and will thereafter pass into the branch optical fiber 22. The thus attenuated light beam will pass from the branch optical fiber 22 into the main optical fiber 23 where it is directed against a single light-responsive transducer 24, which will produce an electrical signal correlated to the attenuation of the light beam.

For purposes of control, a portion of the light beam passing through branch optical fiber 17 is split into branch optical fiber 25 for direction against a light-responsive transducer 26, which will produce an electrical control signal pulse each time that the mirror is directing light along the path 21. This control signal will be used in the test circuitry, as will be explained hereinafter.

The light passing along path 21 will not only be attenuated as determined by the transducer 24, but will additionally be scattered by particles or the like contained within the test fluid so that a portion of the light will deviate radially from the path 21 and pass through the optical fiber 27 for direction against a light-responsive transducer 28. The transducer 28 will thus produce an electrical signal correlated to the scattering effect of the fluid within the tube 4 on light beam 21.

For mounting of the light source 14 and transducers 24, 26, 28, opaque housings are preferably rigidly secured by bonding to the opaque tube 4, which forms a tight seal. The respective optical fibers are telescopically and tightly received within the housings 29 by O-rings 30. Thus it is seen that with installation of the transducers and light source, each housing is optically sealed so that no light may escape therefrom into the sealed chamber 8.

As mentioned above, light will be pulsed through the optical fiber 18 with each revolution of the mirror 16, which optical fiber 18 will produce a light beam 31 that will pass through a reference material, for example, a synthetic transparent or translucent rod 32 completely filling the interior of an opaque tube 33. The tube 33 and rod 32 are rigidly secured to the tube 4 by means of two fasteners 34 that are threadedly received within the same. As the light beam passes along path 31, it is attenuated in a known manner by the reference material of rod 32, so that the thus attenuated light will pass into branch optical fiber 35 where it will be directed upwardly into main optical fiber 23 for impingement upon the transducer 24, which will produce an electrical signal correlated to the attenuation of the light beam by the reference material.

The reference material of rod 32 will also have a predetermined light-scattering characteristic so that light passing along the path 31 will be scattered radially into the branch optical fiber 36, which will conduct the scattered light beam arcuately around the inner surface of the tube 4 so as not to interfere with the path 21, after which the scattered light beam will be directed by the optical fiber against the transducer 28, which will produce an electrical signal correlated to the scattering effect of the reference material within rod 32 upon the light beam passing along path 31.

Figure 2:
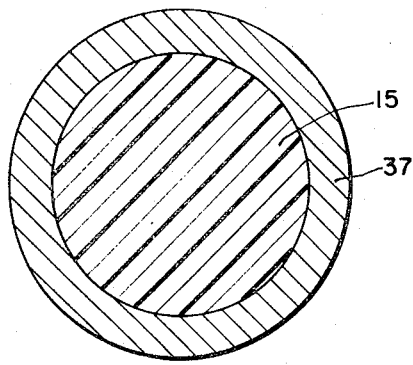
FIG. 2 is a cross-sectional view taken on line II—II of FIG. 1, showing the construction of the optical fibers.

As shown in FIG. 2, the optical fiber 15 is surrounded by a tubular opaque flexible sleeve 37. The optical fiber 15 is constructed of a transparent flexible tube, which is conventional per se. A similar cross section taken through any of the optical fibers 17, 18, 22, 23, 25, 27, 35 and 36 would be substantially identical to the cross section shown in FIG. 2.

Figure 3:
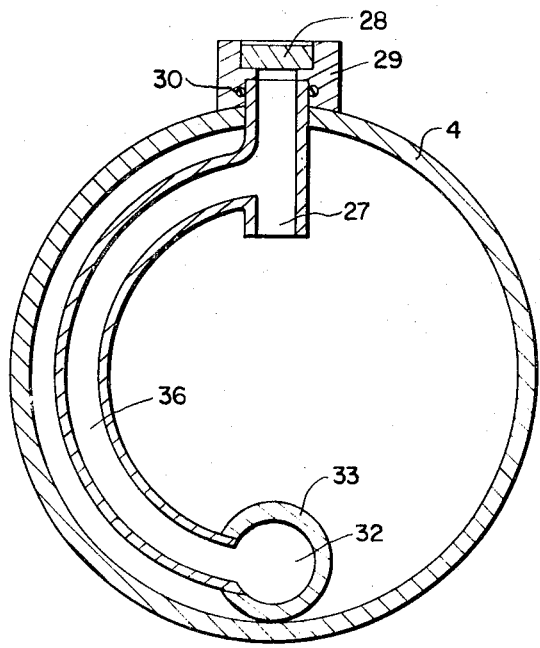
FIG. 3 is a cross-sectional view taken along line III—III of FIG. 1, further showing details of optical fiber construction.

The arcuate extent of the branch optical fiber 36 is shown in FIG. 3, where it extends from immediately adjacent the reference material rod 32 to communication with the optical fiber 27.

Figures 4, 5:
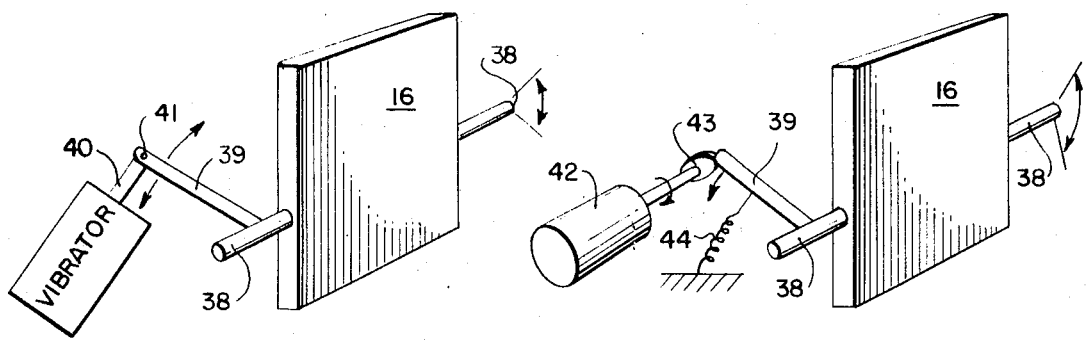
FIG. 4 shows a modification of the mirror driving means shown in FIG. 1.
FIG. 5 is a further modification of the mirror driving means.

Instead of employing the motor and belt drive 20, 19 of FIG. 1, the mirror 16 may be oscillated between its two positions (one for reflecting the light from source 14 into optical fiber 17 and the other for reflecting the light into optical fiber 18) by the structure shown in FIG. 4. The mirror 16 is mounted for rotation on opposed shafts 38 in suitable bearings (not shown). An arm 39 is rigidly secured to one of the shafts 38 and extends radially therefrom. Oscillation of the mirror 16 about its shafts 38 is obtained by means of a vibrator 40, which is attached by means of a pivot pin 41 to the terminal end of arm 39.

FIG. 5 shows another embodiment of the FIG. 4 mechanism for oscillating the mirror 16 about its shafts 38. An electric motor 42 rotates a cam 43 secured to its shaft, which cam in turn bears against the outer end of the arm 39 for producing an oscillation of the mirror 16. A spring mechanism 44 holds the arm follower 39 into tight engagement with the cam 43.

Figure 6:
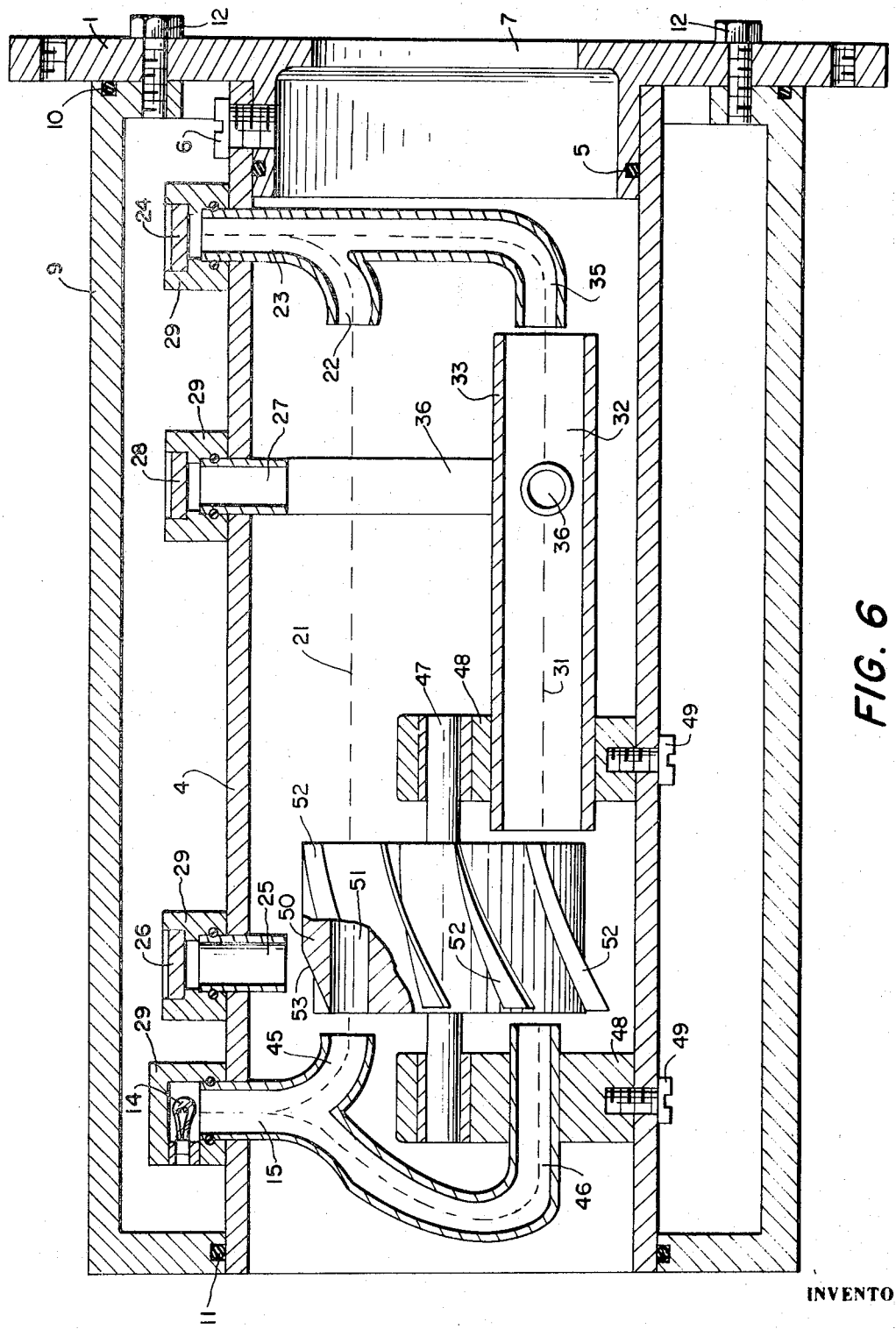
FIG. 6 is a cross-sectional view similar to FIG. 1, but showing a rotating screen for switching the light means.

The embodiment of FIG. 6 employs a rotatable screen, instead of the rotatable mirror of the FIG. 1 embodiment. Otherwise, much of the structure is identical between FIGS. 1 and 6, so that corresponding numbers will be provided for like structure, with reference being made to the description above for applicability to FIG. 6.

The light from source 14 is conducted through the optical fiber 15 where it is put into two branch optical fibers 45, 46, which direct the light on two parallel paths diametrically opposed with respect to a shaft 47. The shaft 47 is journaled at its opposite ends in suitable bearings 48 that are respectively secured to the inside of the tube 4 by means of machine screws 49. A screen disc 50 is carried by the shaft 47 for rotation intercepting the light paths 21, 31. The screen 50 has at least one axially extending passage 51 that will alternately align with path 21 and path 31 for each revolution of the shaft 47. With the use of one passage 51, light will alternately travel along path 21 and path 31, much in the same way light alternately traveled along paths 21 and 31 with respect to the above-described FIG. 1 embodiment wherein the mirror was used as the switching device. Thus, the attenuation and scattering description above with respect to FIG. 1 is equally applicable with respect to FIG. 6.

The tube 33 and reference material rod 32 are held in their position by means of being telescopically received within the adjacent bearing block 48, as shown, where it is bonded or otherwise rigidly secured.

The screen 50 is rotatably driven by means of a plurality of turbine blades 52. With flow of sample fluid material axially through the tube 4, the fluid material will react on the blades 52 to rotatably drive the screen 50. Alternatively, screen 50 could be rotated by a separate drive motor (not shown) and the blades 52 used to pump fluid material from a sump through the monitor.

Light is conducted to the control signal transducer 26 by means of a bevelled surface 53 that will reflect light from the branch optical fiber 45, into the optical fiber 25. With the bevelled surface 53, which acts as a mirror, radially adjacent the passage 51, a control signal will be produced by the transducer 26 each time that the passage 51 is aligned with the path 21, that is each time that a sample attenuation signal and scattering signal is produced respectively by the transducer 24 and 28.

As a further variation of the FIG. 6 embodiment, the screen 50 may be constructed of sheet metal with two passages 51 and the blades 52 merely being cut out and bent portions. The shaft 47 would be welded or otherwise rigidly secured to the sheet metal screen 50. However, according to FIG. 7, the control signal producing mechanism 53, 25, 26 of FIG. 6 would be replaced by a magnet 54 and stationarily mounted magnetic pickup 55. With such a construction, an electric control signal would be produced by the pickup 55 each time that the magnet 54 passed, that is once for each revolution of the screen 50. In this manner, a control signal would be produced that would correlate with the positioning of the passages 51 with respect to the light paths 21, 31.

Figure 8:
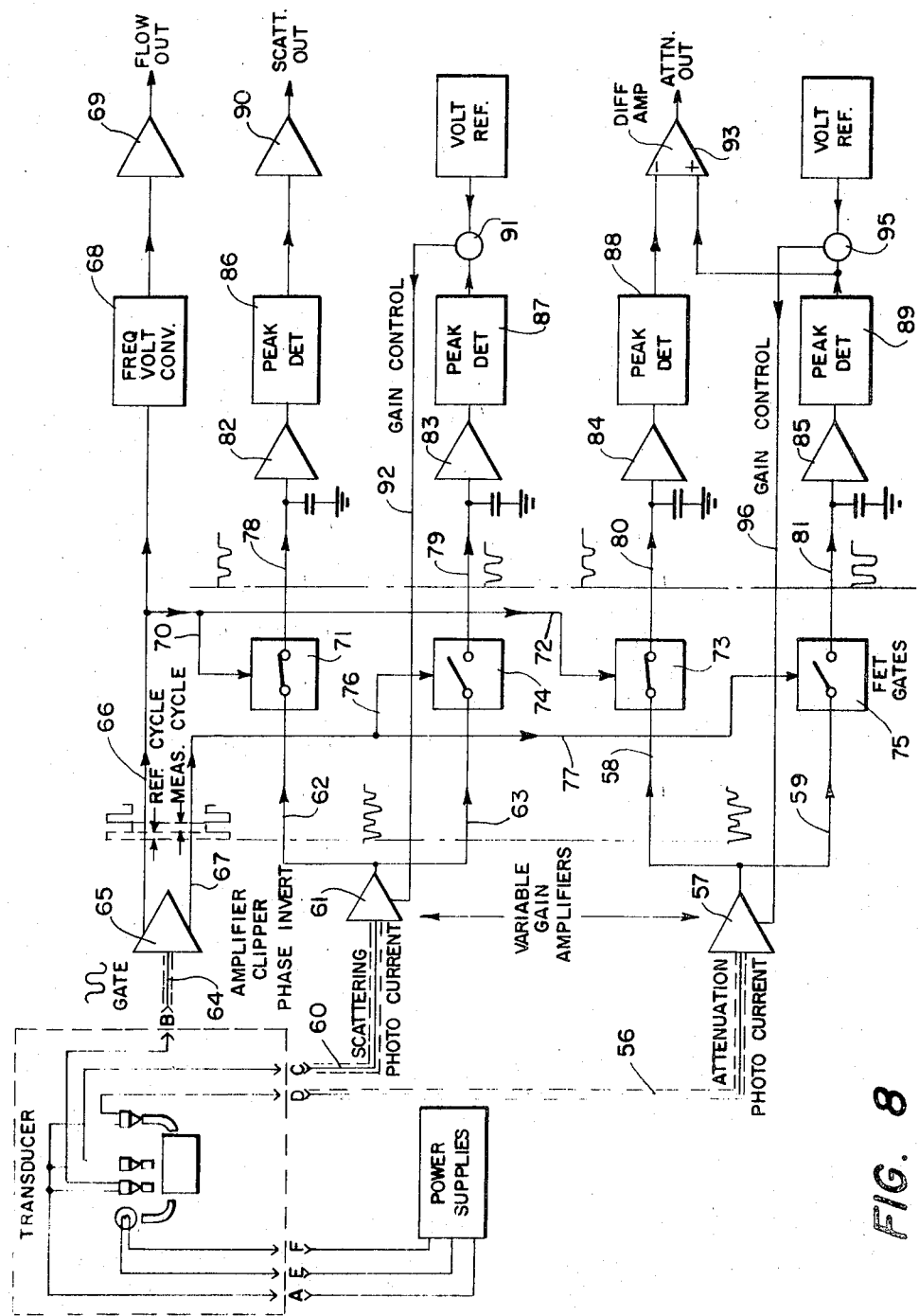
FIG. 8 is a schematic electric diagram showing the electrical interrelation of the various components, along with suitable control circuits.

With the electrical circuitry shown in FIG. 8, the attenuation signal produced by the transducer 24, which will have signal portions alternately corresponding with attenuation by the fluid sample and attenuation by the reference material, will be fed from line 56 into a variable gain amplifier 57, where it is amplified and split to lines 58, 59, with the waveform as shown between lines 58 and 59. Similarly, the electrical signal produced by the transducer 28, which will have portions corresponding to the scattering effect of the light beam within the sample material and the scattering effect of the light beam within the reference material will be fed through line 60 into the variable gain amplifier 61, where it will be amplified to the waveform shown and split to lines 62 and 63. The control signal produced by the transducer 26 or transducer 55 will be sent by line 64 into the phase inverter and clipping amplifier 65, with the indicated input gate waveform. The amplifier will produce a first output control signal in line 66 whose positive polarity half-cycle pulses coincide with the reference half-cycle and an inverted output control signal in line 67 whose positive polarity half-cycle pulses coincides with the measurement half-cycle as depicted by the waveforms adjacent lines 66 and 67. Thus, it will be appreciated that the signals on lines 66 and 67 are 180° out of phase.

The positive polarity control pulses supplied through line 66 coincide with and are correlated to the reference cycle, that is, a positive polarity control pulse is produced each time that the scattered and attenuated light beams from the reference material within rod 32 are received by their respective transducers 28, 24. The reference cycle control pulses from line 66 are fed by means of line 70 to a field-effect transistor gate 71, which is shown in the closed condition which it assumes during each measurement half-cycle. Hence gate 71 is of the type employing a field-effect transistor which is rendered conductive (closed) upon the application of a negative polarity control pulse to its gate electrode and opens on the application of a positive polarity control pulse to the gate electrode. This is also true of gates 73, 74 and 75 to be described hereinafter. Thus, the gate 71 will be closed only when the scattering photocurrent in lines 60 and 62 is correlated to the scattering produced by the sample material to be measured. Line 72 feeds the reference cycle control pulses to the field-effect transistor gate 73, which is shown in the closed condition corresponding to the measurement cycle, for opening the gate 73 each time that the singal on line 58 corresponds to only the attenuation produced by the reference material. Conversely, the gate 73 will be closed during intervals while the attenuation signal from photodetector 24 is attenuated by the sample material to be measured and supplied through amplifier 57 to line 58.

The measuring cycle control pulses derived by amplifier 65 and supplied over line 67 to field-effect transistor gates 74, 75 are 180° out of phase with respect to the current pulses supplied to gates 71 and 73. Thus, each time that there is a positive polarity control pulse fed to gates 71 and 73, there will be a negative polarity pulse supplied over conductors 76 and 77 to gates 74 and 75 and vice versa. Hence, gates 71, 73 will be closed during the measurement half-cycle while gates 74, 75 are open and in a like manner, gates 74, 75 will reference half-cycle while gates 71 and 73 are opened. Consequently, only scattering current corresponding to the reference material will be fed through gate 74 to peak detector 87 for controlling the gain of variable gain amplifier 61 to compensate for aging, power supply voltage fluctuation, etc. Only scattering current corresponding to the measured or sample material will be passed through gate 71 for detection by peak detector 86 and measurement by a suitable indicator (not shown). Similarly, the attenuated current corresponding to the reference material will be passed through gate 75 for controlling the gain of variable gain amplifier 57, and only attenuated current corresponding to the measured sample material will be passed through gate 73. The gates 71, 73, 74 and 75 are shown in the respective closed and open conditions which they assume during the measurement half-cycle. They assume the opposite condition during the reference half-cycle. The wave forms of the signals supplied through each of the gates 71, 74, 73, 75 is shown in connection with their output lines 78, 79, 80, 81, respectively.

The signals gated through each of the lines 78, 79, 81, 81, respectively, are acted upon by otherwise the conventional electronic amplifiers 82–85 and peak detectors 86–89, respectively. The output of the peak detector 86 is further amplified at 90 and supplied to a gauge, or other suitable indicating instrument, alarm, or device as an indication of a scattering produced by the reference material. The output of the peak detector 87 is compared with a voltage reference at 91 to produce a differential signal fed back along line 92 for gain control of the variable gain amplifier 61, to compensate for variations in the system during operation not caused by changes in the sample fluid such as aging, power supply variations, etc.

The output of the peak detector 88 is fed to a differential amplifier 93 along with the output of the peak detector 89, to produce a differential attenuation output in line 94. The output of the peak detector 89 also is supplied to a summing circuit 95 along with a voltage reference to produce a gain control error signal in line 96 that is fed back to control the gain of variable gain amplifier 57 in a manner similar to 61.

Figure 7:
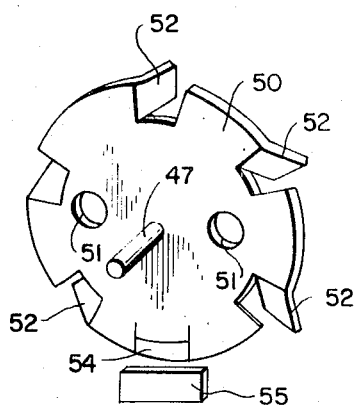
FIG. 7 is a perspective view of a modification of the rotating screen of FIG. 6, along with a magnetic control signal pickup.

For the embodiments of FIGS. 6 and 7, the frequency of the signal contained within line 66 will correspond to the rotational speed of the screen. In turn, this frequency will be correlated to the flow of fluid sample material through the tube 4. The frequency voltage converter 68 having an input from line 66 will produce an output, which after amplified at 69, can be connected to a suitably calebrated meter for directly indicating sample fluid flow or otherwise used where appropriate.

For a more detailed description of the operation and control aspects of the measuring and gain controlling circuit shown in FIG. 8, reference is made to applicant's above-mentioned copending application, the disclosure of which is incorporated herein in its entirety. While several specific embodiments, variations and modifications have been shown for purposes of specifically illustrating the invention, there is no intention to be solely limited thereto.

What is claimed is:

1. Apparatus for testing a sample of material to determine at least one characteristic correlated to the affect the material has on light, comprising: means for holding a sample material; separate means for holding a reference material having known light-affecting characteristics; alternate light-directing means for passing light alternately through each of said means for holding to alternately pass the light through the sample and reference material respectively and including only a single light source; single attenuated light-responsive means for intercepting the attenuated light after it has passed through said means for holding a sample material and after it has passed through said means for holding a reference material respectively to produce an attenuation electrical output having correspondingly alternating sample and reference electrical signals in response to the light intercepted; single scattered light-responsive means mounted with respect to said holding means and said means for passing light so that it receives the light scattered by said materials to produce a single scattering electrical output correspondingly alternating between sample and reference signals; a wall means forming a sealed chamber separate from a fluid sample to be tested; said light source being mounted in said chamber; each of said light-responsive means being mounted in said chamber; first optical fiber means sealingly extending through said wall means from said light source; second and third optical fiber means sealingly extending through said wall means respectively from each of said light-responsive means to spaced branched inlets; said spaced branch inlets of said second optical fiber means are positioned to receive light which has passed through said means for holding a sample material and means for holding a reference material respectively; said spaced branch inlets of said third optical fiber means are positioned to receive light which has been scattered by a material in said means for holding a sample material and means for holding a reference material respectively; said means for holding a reference material being outside of said chamber; branch optical fiber means conducting light from said first optical fiber means substantially only through said means for holding a reference material on a path to one branch of said second optical fiber means and at intersecting right angles to one branch of said third optical fiber means; and separate branch optical fiber means for passing light from said first optical fiber means through said sample of material on a separate path to another branch of said second optical fiber means and at intersecting right angles to another branch of said third optical fiber means.

2. Apparatus for testing a moving fluid sample of material to determine at least one characteristic correlated to the affect the material has on light, comprising: means for holding a moving fluid sample material along a predetermined path; separate means for stationarily holding a reference material having known light affecting characteristics; and means for passing light alternately through each of said means for holding to alternately pass the light through held material and including only a single light source; light-responsive means for intercepting the light after it has passed through said means for holding a sample material and after it has passed through said means for holding a reference material to produce sample and reference electrical signals in response to the light intercepted; said means for passing light including an opaque screen having transparent and opaque portions and being mounted for movement between a first position wherein a transparent portion is optically between said light source and said means for holding a sample material and an opaque portion is optically between said light source and said means for holding a reference material, and a second position wherein a transparent portion is optically between said light source and said means for holding a reference material and an opaque portion is optically between said light source and said means for holding a sample material; and said screen being freely mounted for rotation about an axis and including a plurality of turbine blade means for reaction with sample fluid material moving along said path through said apparatus to rotate said screen through at least said two positions.

3. The apparatus of claim 2, wherein said light-responsive means produces a single electrical output containing both said signals; including magnetic means for producing an electric pulse each time said screen passages a predetermined reference point; and means responsive to said pulse for separating said electrical output into a sample signal output and a separate reference signal output.

4. The apparatus of claim 2, wherein said opaque screen is constructed of a single piece of sheet metal having a plurality of L-shaped peripherally arranged cuts forming a corresponding plurality of tabs bent on radially extending lines to form said turbine blade means.

5. The apparatus of claim 2, wherein said light-responsive means is singular and directly receives the light attenuated by the sample and reference material to produce a single electrical output containing both said signals; and further including a single scattered light-responsive means mounted with respect to said holding means and said means for passing light so that it receives the light scattered by the reference and sample materials to produce a single scattering electrical output correspondingly alternating between sample and reference signals.

* * * * *